April 6, 1937.                P. A. JANSSENS                2,076,431
                         PATCHING DEVICE AND METHOD
                         Filed March 13, 1936        4 Sheets-Sheet 1
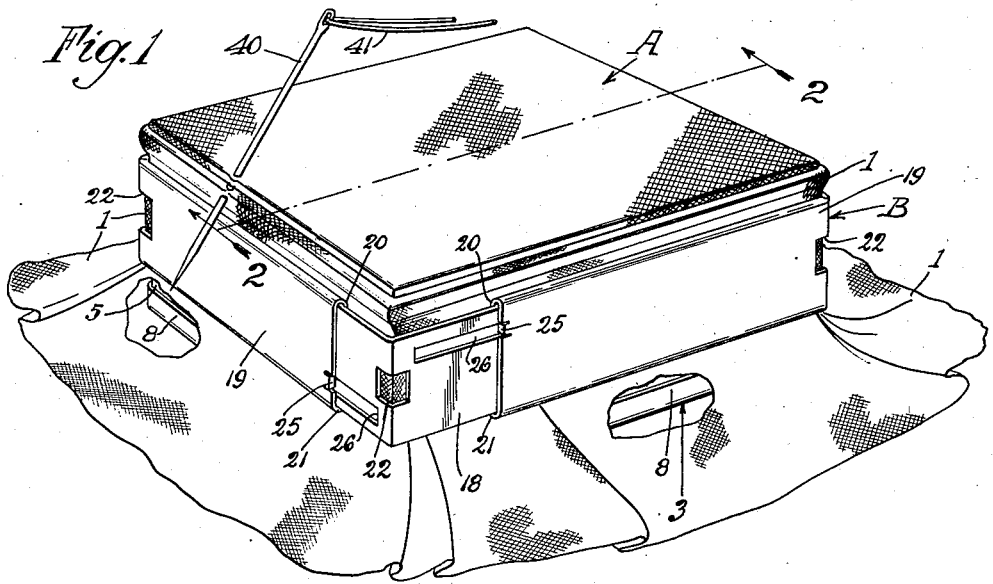
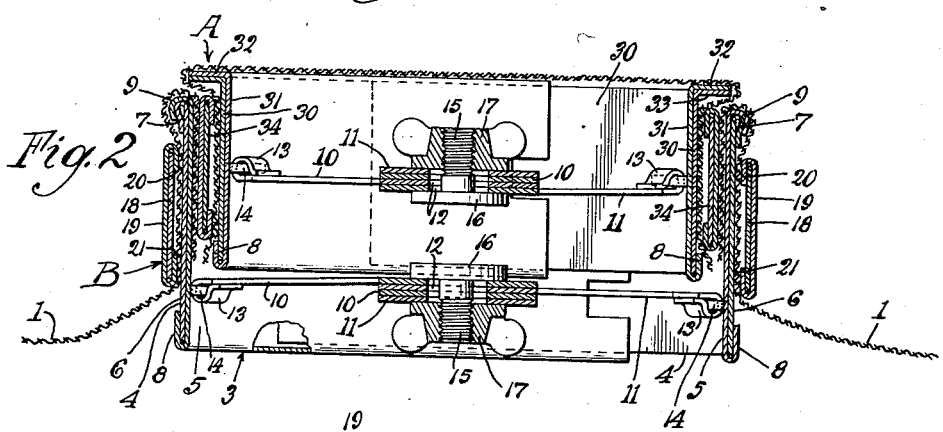
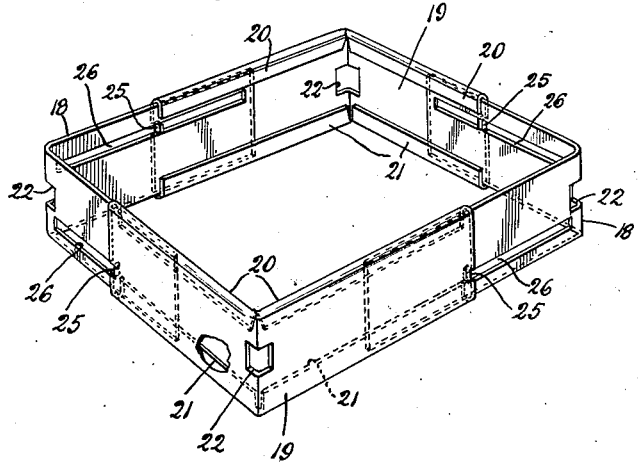
Inventor
Peter A. Janssens
by Parker & Carter
Attorneys.

April 6, 1937.　　　　P. A. JANSSENS　　　　2,076,431
PATCHING DEVICE AND METHOD
Filed March 13, 1936　　　4 Sheets-Sheet 2
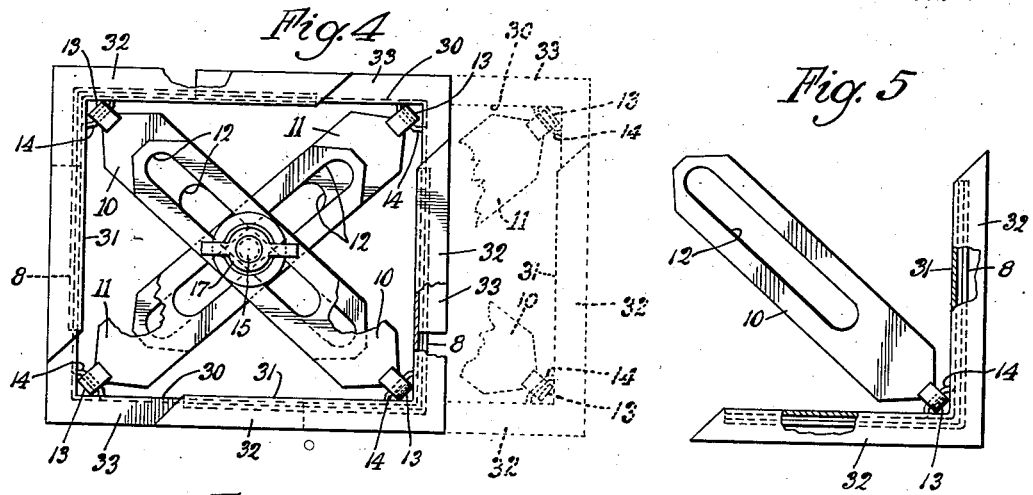
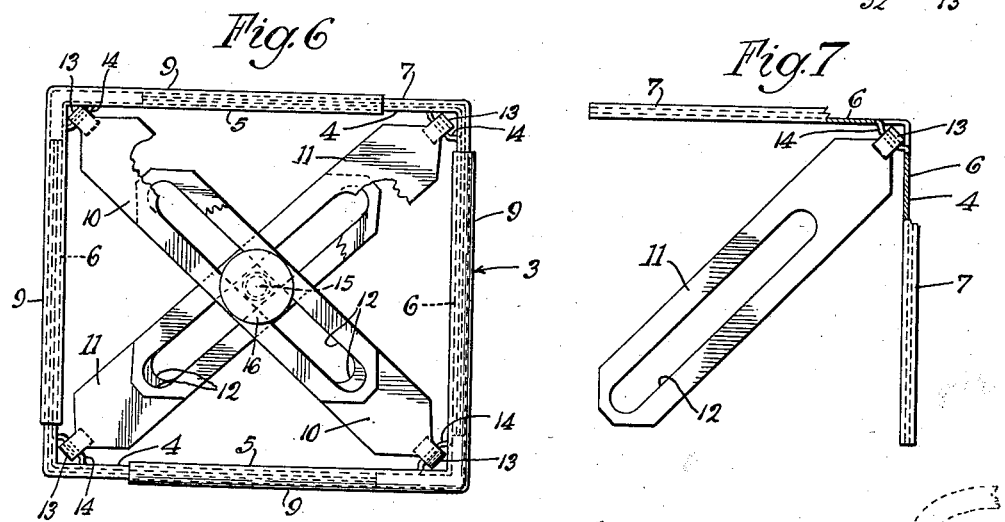
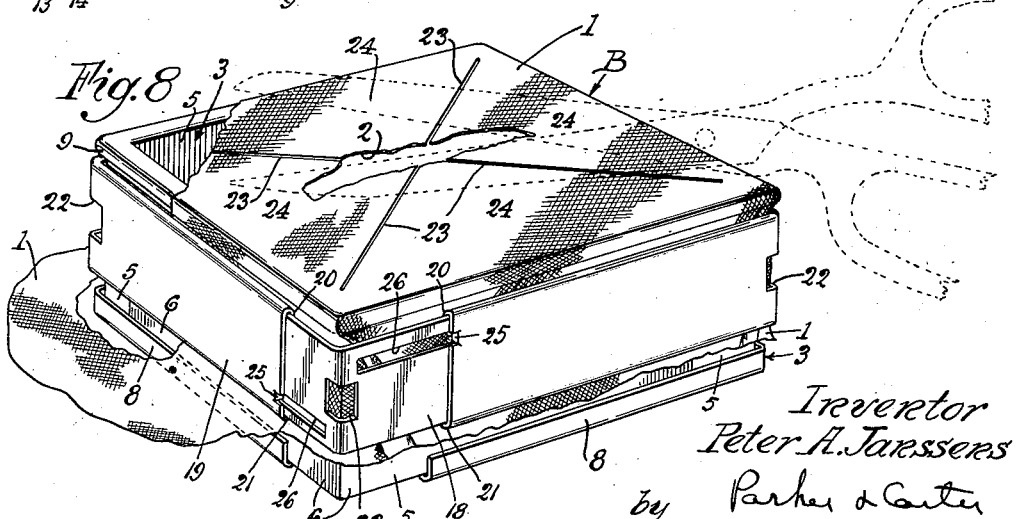
Inventor
Peter A. Janssens
by Parker & Carter
Attorneys.

April 6, 1937.  P. A. JANSSENS  2,076,431
PATCHING DEVICE AND METHOD
Filed March 13, 1936  4 Sheets-Sheet 3

Inventor
Peter A. Janssens
by Parker & Carter
Attorneys.

April 6, 1937.  P. A. JANSSENS  2,076,431
PATCHING DEVICE AND METHOD
Filed March 13, 1936  4 Sheets-Sheet 4
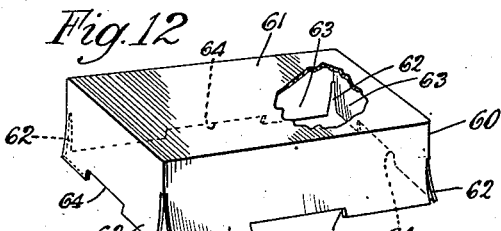
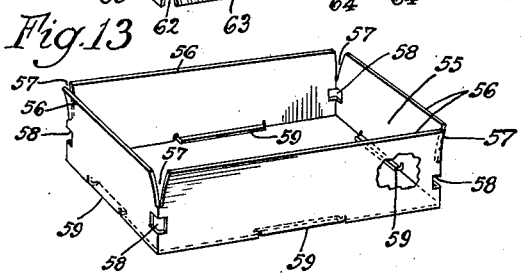
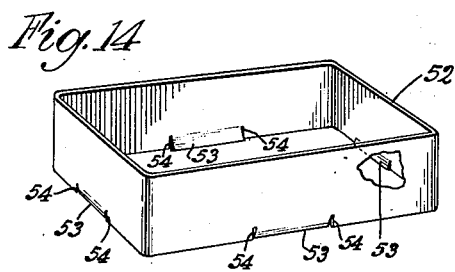
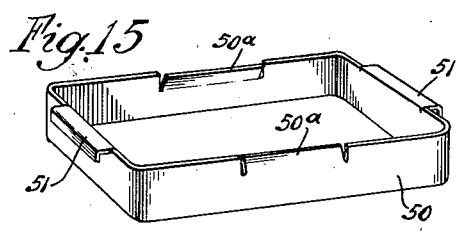
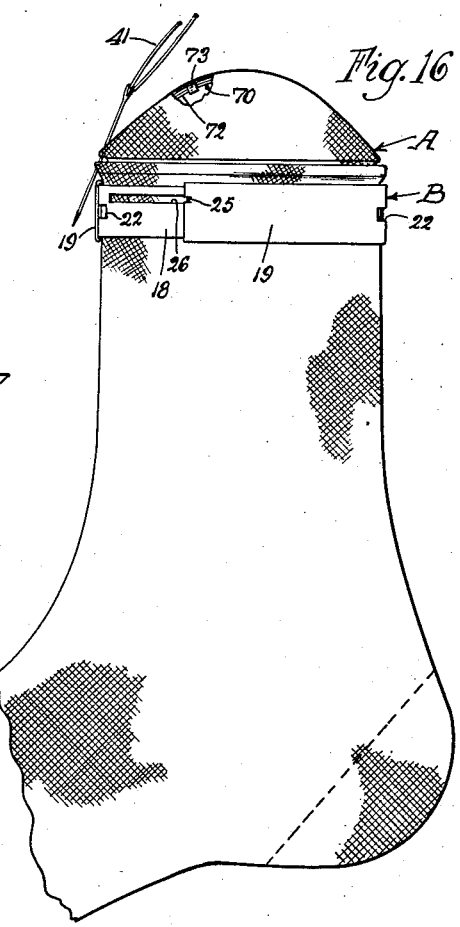
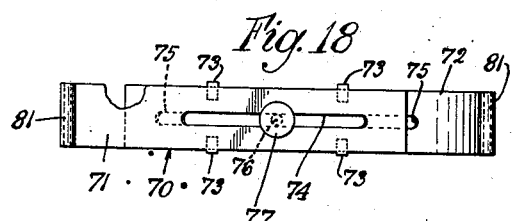
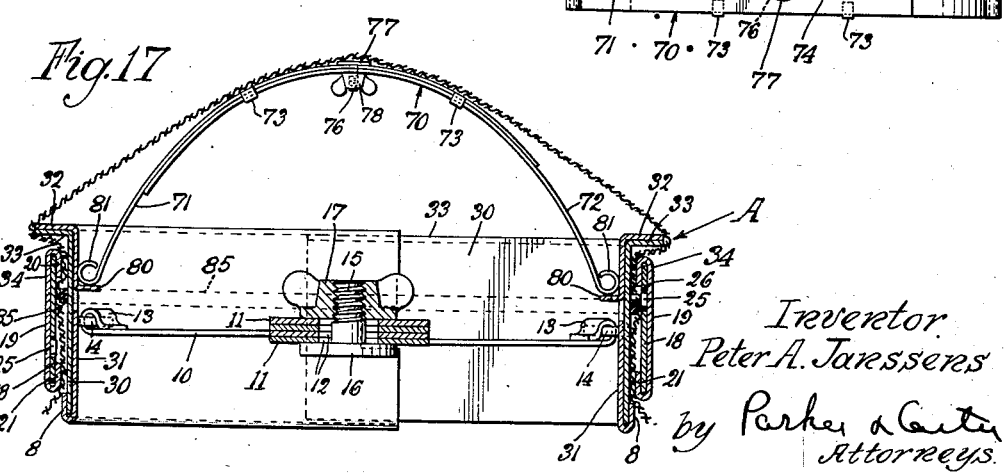
Inventor
Peter A. Janssens
by Parker & Carter
Attorneys.

Patented Apr. 6, 1937

2,076,431

UNITED STATES PATENT OFFICE 2,076,431

PATCHING DEVICE AND METHOD

Peter A. Janssens, Chicago, Ill.

Application March 13, 1936, Serial No. 68,629

8 Claims. (Cl. 223—100)

My invention relates to a patching or mending apparatus and method and has for one purpose the provision of a method of and means for mending any substance, such as cloth, which is likely to become ripped, torn or worn. One purpose is the ready means of inserting a patch. Another purpose is the provision of means for accurately sizing the patch to an aperture of determined size. Another purpose is the provision of means applicable for the insertion or sewing of patches of various size. Another purpose is the provision of means for tensioning the patch and the article patched, whereby the size and position of the patch in relation to the article patched are accurately controlled and determined. Other objects will appear from time to time in the course of the specification and claims.

I illustrate my invention more or less diagrammatically in the accompanying drawings, wherein—

Figure 1 is a perspective view illustrating the patch and the article patched ready for the sewing operation;

Figure 2 is a section on the line 2—2 of Figure 1;

Figure 3 is a perspective view of one of the clamping members illustrated in Figure 1;

Figure 4 is a plan view of the inner clamp illustrated in Figure 2;

Figure 5 is a detail of the structure shown in Figure 4;

Figure 6 is a plan view of the outer clamp illustrated in Figure 2;

Figure 7 is a detail of the structure shown in Figure 6;

Figure 8 illustrates the outer clamp, with the article to be patched in position, and illustrates the forming or sizing of the hole to which the patch is to be applied;

Figures 12, 13, 14 and 15 are perspective views of the various parts shown in Figures 10 and 11;

Figure 16 illustrates the application, to my clamping device, of an arcuate form or spring adaptable for use when the toe or heel of a stocking or some similarly curved member is being patched;

Figure 17 is a section illustrating the application, to my clamp, of the spring structure shown in Figure 16; and Figure 18 is a plan view of the spring itself.

Like parts are indicated by like symbols throughout the specification and drawings.

Figure 9:
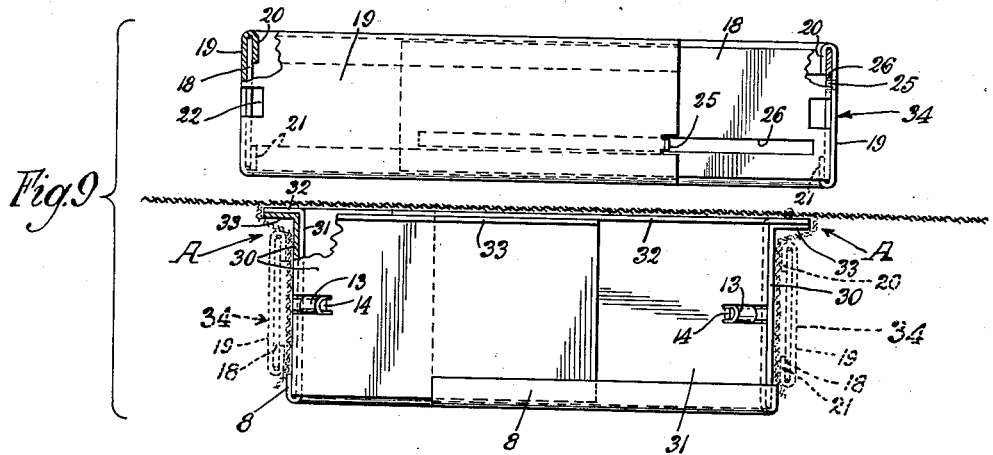
Figure 9 is a side elevation with parts in section illustrating the clamping of the patch to the inner clamp of Figure 2. The circumferential clamping member of the inner clamp is shown at two positions, one position in full line, before its application to the patch and the second position in dotted line, with the patch clamped in position.

Referring to the structure and to the process of use, as generally indicated in the drawings, I illustrate an outer clamp structure for clamping and tensioning the article to be patched. It is individually shown, for example, in Figure 8, with the material to be patched shown as at 1 and the hole making the patch necessary illustrated at 2. In order to tension the patched substance 1, I stretch it over a frame generally indicated as 3 which includes a pair of opposite angle members 4, 4, which are slidable in another pair of opposite angle members 5, 5. Each pair of angle members may be identical and each individual angle member is slidable in relation to the two adjacent or contacting angle members. It will be observed, as in Figure 2, that the web or flat portion 6 of one of the members 4, with its upper flange 7, is surrounded, top and bottom, by the lower flange 8 of one of the members 5, and the upper flange 9. This provides a telescopic relationship between each arm of each of the members 4 and 5, with the adjacent arms of the adjacent members, whereby the length of the sides of the clamp can be adjusted. The clamp is always maintained in rectangular form but, within a substantial range, it may be made a square or an equi-lateral or a non-equi-lateral rectangle, of a substantial range of size. In order to lock the parts in position at any desired adjustment, I illustrate converging links 10, 11, each such link being slotted as at 12 and being provided with a hinge or eye 13 surrounding any suitable pivot loop 14, there being such a loop or pivot at the corner of each of the members 4 and 5. The links 10, 11, converge and may be locked together at any desired adjustment of the clamp, as by the lock screw 15 which has a clamping base 16 and which is screw-threaded to receive a locking thumb nut 17.

Assume that the frame structure thus described has been set or locked in position at some predetermined size. The substance 1, to be patched, is then applied thereto, and held under tension thereagainst by any suitable outer clamping member. I illustrate, as in Figure 8, on outer clamp formed of four interpenetrating angles shown in detail in Figure 3. Opposite angles 18, 18 of flat sheet or strip stock may penetrate adjacent angles 19, 19, each of which has an upper inturned flange 20 and a lower inturned flange 21. Thus the outer clamping member can be expanded to surround the inner clamping member and can then be compressed into position thereabout, as shown in Figure 8. The frictional resistance is sufficient to hold the outer clamping member in the position in which it is shown in Figure 8. For convenience in application, I provide corner apertures 22. It will be understood, of course, that any suitable irregularity or notching can be employed. In order to prevent the telescoping members 18 and 19 from being pulled apart, the members 19 are provided with inwardly bent lugs 25 which penetrate limit slots 26 in the angle members 18.

Assume that the cloth, or other substance to be patched, is in the position of Figure 8, and under tension, the operator then makes crossing cuts, illustrated at 23, to produce flaps 24 which may then be folded down inside the inner clamp member 3.

Figures 4 and 5 indicate the clamp member for the patch proper. As the patch clamp is to be inserted within the inner clamp member 3 of the article to be patched, it is of somewhat smaller size but is shown as similarly expansible or adjustable and, except for certain points of differentiation, the same identifying numbers are applied, and the description of the outer clamping means will apply. As shown in Figures 4, 5 and 9 the inner clamp member of the patch clamp includes interpenetrating angles illustrated respectively as 30, 30, and 31, 31. They are each provided with relatively broad plane outwardly extending flanges 32, 33. Otherwise, the structure is the same as in the clamp for the material to be patched. The outside clamping member for the patch securing means, which I indicate generally as 34 is also identical in detail with the corresponding members 18, 19, as shown in Figure 3.

In the use of the device the material to serve as a patch is positioned about the patch clamp members 30, 31, as shown in Figure 2, and the surrounding edges are locked in position, as by the outer clamp member 34. Then, as a matter of convenience, the spare edge of the patch may be trimmed away by scissors. Thereafter the patch clamp, with the patch in position, is dropped into the central space of the clamp holding the article to be patched. For clearness I indicate the patch clamp assembly as a whole as A and the assembly for the article to be patched as B. It will be clear, from Figures 1 and 2, that assembly A is lowered into assembly B, in such fashion that the edge of the patch, under tension, is applied to the tensioned edge of the aperture of the article to be patched. This will be clear in Figures 1 and 2. The user then can take any suitable needle or the like 40, with the thread 41, and sew the patch in place. Preferably he sews downwardly through the patch in such fashion that the point of the needle glances on the rounded edge of the flange 9 and passes through the edge of the article being patched. Inasmuch as the parts are held firmly in position it is easy for the user to sew a very quick seam. Both the article being patched, and the patch, being under tension, the result is a snug well fitted patch.

In employing my method it is, of course, important that the user size the patch properly in relation to the aperture to be patched. The size can easily be gauged by adjusting first either the clamp of assembly A or the clamp of assembly B. Then the clamp of the opposite assembly is simply adjusted in relation to the already fixed clamp, which is very easy and simple. Thereafter, the cloth or material being patched can be locked into place, and the method above described carried out.

Figure 10:
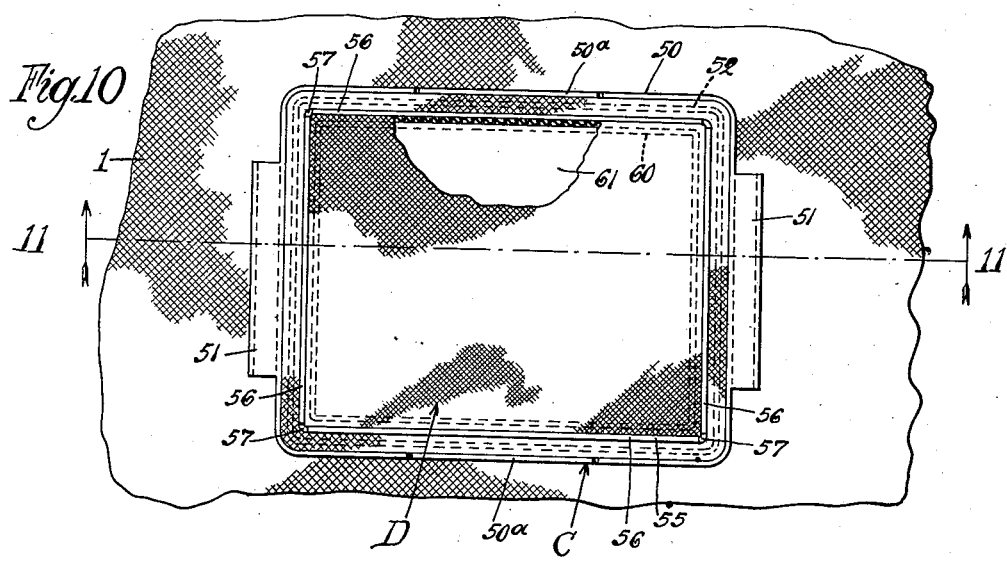
Figure 10 is a plan view of a variant form.
Figure 11:
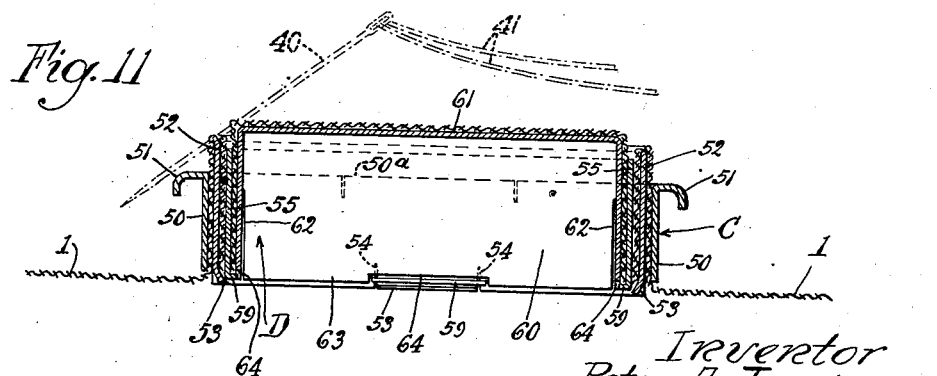
Figure 11 is a section on the line 11—11 of Figure 10.

Referring to the form of Figure 10 and following, the operation of the method is the same, except for the omission of the feature of adjustability. I illustrate, in the variant form, an outer assembly generally indicated as C, for the material being patched and an inner assembly generally indicated as D, to hold the patch. Referring to the individual parts, Figure 15 illustrates a circumferential outer member 50, having at each end downwardly recurved or turned flanges 51 intended as handles or finger engaging members. 52 generally indicates the inner member of the assembly C. It is of such size as to slip readily into the member 50. Along the lower edges are slightly curved bent in portions 53 defined at each end by slots 54. It will be understood that the material to be patched is clamped between the members 50 and 52, as shown in Figure 11. Assume that the material to be patched is ready for patching, cut for example, as shown in Figure 8, the inner assembly D can be slipped in place with the patch. This inner assembly D includes an outer member generally indicated as 55, with the upper edges of each side bent out as at 56, and split in the corners as at 57. The corners may also be provided with additional notches or roughened portions 58, for easy handling. Offset portions or ledges 59 are shown extending inwardly from the bottom of each wall, as shown in Figure 13.

60 indicates the inner member of the assembly D. It is provided with a closed top 61. Its corners are slit as at 62 and the lower portions of each wall are outwardly bent or flared as at 63, and are provided with apertures or notches 64, conforming to the ledges 59 of the members 55. The patch is tensioned over the top 61 and is gripped between the members 55 and 60 as shown in Figure 11. This brings the edge of the patch adjacent the edge of the aperture, as shown in Figure 11, and the user can stitch the two edges together very conveniently. The flared-out portions of the members 55 and 60 serve to tension the material and to hold the whole assembly tightly together. The portions 63 grip, primarily, the edge of the patch material and the portions 56 are effective to hold the edge of the material to be patched. When the member 60 is pressed down into the member 55 the apertures 64 snap into the ledges 59.

Along the upper edge the outer clamp member 50 is preferably formed with inwardly bent portions 50a to provide frictional engagement with the opposed walls of the inner member 52 of various thicknesses of material. In the assembled position, illustrated in Figure 11 the curved portions 53 help to align the edges of the material and patch and further prevent the member 55 from being pushed inwardly during sewing operation.

Referring to Figures 16 to 18, where I wish to patch a bulged or curved member, such as the toe or heel of a sock, I may employ an additional curved form member. I illustrate, for example, the spring structure generally indicated as 70. It may include a pair of separate leaves 71, 72, one of which is provided with lugs or clips 73 to surround the edge of the other, whereby to provide a telescopic or length varying effect. Both leaves are slotted as at 74, 75, and any suitable securing screw 76 may pass through the slots with the locking base 77 and the locking thumb nut 78. Any suitable means may be employed for securing the spring member 70 in relation to the clamp with which it is employed. I may, for example, provide ledges 80 extending inwardly from the innermost clamp member.

I illustrate the ends of the springs as recurved as at 81.

It will be realized that whereas I have described and shown a practical and operative device, nevertheless many changes may be made in the size, shape, number and disposition of parts without departing from the spirit of my invention. I therefore wish my description and showing to be taken as in a broad sense illustrative and diagrammatic rather than limiting me to my specific showing.

The use and operation of my invention are as follows:

In the form of Figures 1 and following I provide a variable or adjustable means for putting in patches of a wide variety of sizes and shapes. Whereas I have illustrated the adjustable clamp members for the patch and the material to be patched as rectangular, it will be realized that I do not wish to be limited to any particular form. For example, I might employ round or oval members of adjustable circumference.

The various forms have this in common, that in each case one clamp of one size is employed for gripping and supporting the edge of the material to be patched, about the aperture to be filled by the patch. The patch itself is gripped and supported by another clamp. The patch and the patch clamp are positioned within the aperture to be filled. The user then stitches through along the opposed edges, as shown in Figures 1, 11 and 16. I may find it desirable to sell patch clamps of standardized size. Such a set is shown in Figures 12 to 15 inclusive and is shown assembled in Figures 10 and 11. These clamp sets may, of course, be made in any suitable form and size.

Figures 16 to 18 illustrate a variant form in which any suitable supplemental support, such as the spring 70, is employed for bulging out or supporting a rounded member or patch. Otherwise the operation is the same. It will also be realized that a wide variety of upwardly projecting forms may be employed and the one that I have shown is merely illustrative although it is a convenient form applicable, for example, to patching stockings or socks.

In Figure 17, I have illustrated additional friction means, for gripping the patch, in the form of a rubber band 85, positioned about the inner clamp member of the patch clamp. The material of the patch is thus pinched between the outside clamping member 34 and the rubber band 85. A similar flexible band may also be placed about the frame 3 for clamping and tensioning the article to be patched.

I claim:

1. In a device for applying patches to patchable materials, an adjustable inner frame and a clamp therefor, and an adjustable outer frame, and a clamp therefor, the inner frame being adapted to be positioned within the outer frame, with the upper edges of the two frames adjacent each other, the outside measurements of the inner frame being less than the inside measurements of the outer frame, when the frames are assembled in operative position.

2. In a device for applying patches to patchable materials, an inner frame and a clamp therefor, and an outer frame, and a clamp therefor, the inner frame being adapted to be positioned within the outer frame, with the upper edges of the two frames adjacent each other, the outside measurements of the inner frame being less than the inside measurements of the outer frame, when the frames are assembled in operative position.

3. The method of patching a patchable material which includes securing the material to be patched in a frame, cutting away the material to form an aperture of predetermined size, maintaining a patch under tension, positioning the patch, under tension, in said aperture, sewing the patch and the material to be patched together along the edge of the aperture, and subsequently releasing the patch and the material being patched.

4. In a device for applying patches to patchable materials, an inner clamp adapted to grip and position the patch to be inserted, and an outer clamp adapted to grip and position the material to be patched, said inner and outer clamps conforming in size, the opposed material gripping edges of said clamps lying closely adjacent each other when the clamps are assembled together with the outer clamp surrounding the inner, and an additional patch supporting member extending upwardly substantially above the plane of said gripping edges, the outside measurements of the inner frame being less than the inside measurements of the outer frame, when the frames are assembled in operative position.

5. In a device for applying patches to patchable materials, an inner clamp adapted to grip and position the patch to be inserted, and an outer clamp adapted to grip and position the material to be patched, said inner and outer clamps conforming in size, the opposed material gripping edges of said clamps lying closely adjacent each other when the clamps are assembled together with the outer clamp surrounding the inner, said clamps being independently adjustable as to size, the outside measurements of the inner frame being less than the inside measurements of the outer frame, when the frames are assembled in operative position.

6. In a device for applying patches to patchable materials, an adjustable inner frame and a clamp therefor, and an adjustable outer frame, and a clamp therefor, the inner frame being adapted to be positioned within the outer frame, with the upper edges of the two frames adjacent each other, each said frame including a plurality of interpenetrating and relatively slidable angle members, and means for securing them through a range of adjustments.

7. In a device for applying patches to patchable materials, an adjustable inner frame and a clamp therefor, and an adjustable outer frame, and a clamp therefor, the inner frame being adapted to be positioned within the outer frame, with the upper edges of the two frames adjacent each other, each said frame including a plurality of interpenetrating and relatively slidable angle members, and means for securing them through a range of adjustments, said securing means including slotted links secured to said angle members and a locking member penetrating said slots.

8. In a device for applying patches to patchable materials, an inner frame and a clamp therefor, and an outer frame and a clamp therefor, said inner frame being adapted to penetrate the outer frame, with the opposed edges of said frames closely adjacent, the outside measurements of the inner frame being less than the inside measurements of the outer frame, when the frames are assembled in operative position.

PETER A. JANSSENS.